Dec. 13, 1938. A. G. SOUTHWELL ET AL 2,139,984
GOOSENECK BICYCLE LOCK
Filed July 24, 1936
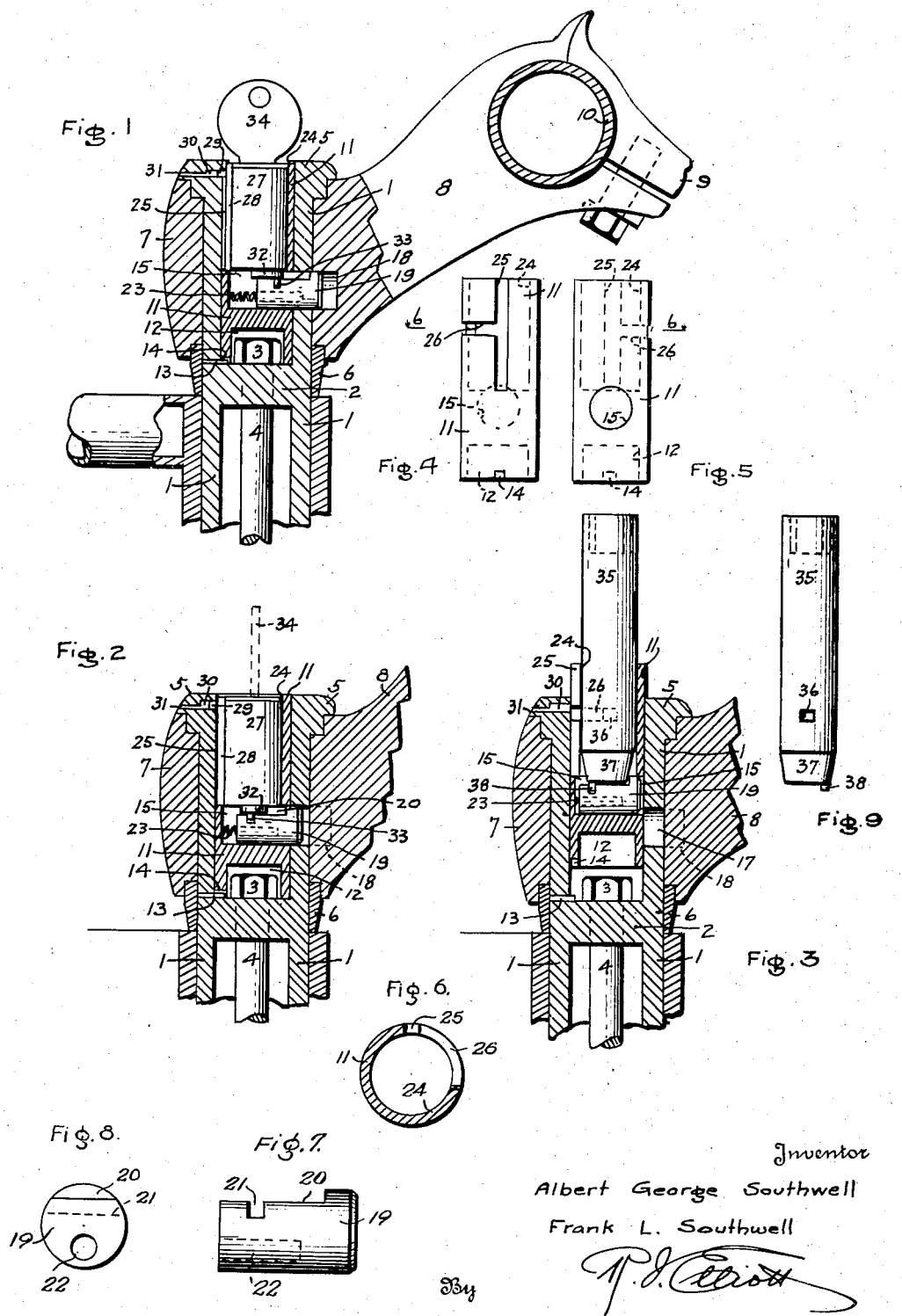

Patented Dec. 13, 1938

2,139,984

UNITED STATES PATENT OFFICE 2,139,984

GOOSENECK BICYCLE LOCK

Albert George Southwell and Frank L. Southwell, South Tacoma, Wash.

Application July 24, 1936, Serial No. 92,410

2 Claims. (Cl. 70—233)

The present invention relates to improvements in bicycle locking devices and has reference more particularly to a gooseneck (bar stem) bicycle lock.

One of the important objects of the present invention is to provide a lock of the above mentioned character whereby a bicycle is locked "loose" or in such manner that the machine cannot be ridden because of the lock's action of disengaging, or disconnecting, the front forks from and with the gooseneck (bar stem) which retains the handle bars of a bicycle.

A further object is to provide a lock which cannot be broken by forceful application of leverage on the bars, frame or forks of the bicycle because the three members, (bars, frame and forks) are free to rotate, together or one apart from the others, or entirely independent, one from another. This is termed locked in a "loose" position or manner as described above.

Still a further object is to provide a bicycle lock which is simple, sturdy and an integral part of the machine; a lock which is readily and quickly removable for replacement or repair and one which employs a standard lock barrel and key.

Still a further object is to provide a mechanism of the above described character which is safe in operation as a locking medium, yet inexpensive and dependable.

Still a further object is to provide a bicycle lock which is visible and accessible at all times, being situated or located directly in front of the operator between the handle bars in the position of the conventional bar stem expansion bolt head on the stem of the gooseneck, (also designated as the "bar stem").

Still a further object is to provide a bicycle lock from which the key cannot be removed while the lock is in position as "locked" for riding, and one in which the locking bar is positive and sure, its position being readily determined by the relative and corresponding position of the key, the bar being also held in locked position by a spring.

We attain these and other objects by the devices, mechanisms, and arrangements illustrated in the accompanying drawing, in which—

Fig. 1 is a vertical section of our improved bicycle lock, showing the parts locked together and in position for operating the bicycle; Fig. 2 is a similar view of a part thereof showing the lock cylinder turned through a quarter turn and the bolt withdrawn from locking position, whereby the gooseneck and handle bars are released from the steering post and the lock-key removed from the lock while the parts are in the position in which the bicycle cannot be operated because the steering means is inoperative; Fig. 3 is another similar view showing the locking bolt completely withdrawn and the lock removed, and showing the holding tool in the sleeve and withdrawing it and the locking bolt from the steering post; Fig. 4 is a rear elevation of the sleeve removed from the post; Fig. 5 is a front elevation thereof; Fig. 6 is a cross-section thereof on the line 6—6 in Figs. 4 and 5; Figs. 7 and 8 are side and rear elevations of the locking bolt, respectively; and Fig. 9 is an elevation of the holding and removing tool.

Similar numerals of reference refer to similar parts throughout the several views.

This device is applied to the steering post of a bicycle, or like vehicle, and is adapted to render said steering post inoperative when the key is removed from the lock, by disconnecting the said post from the handlebars.

In the standard construction of bicycles the steering post, on which the front fork of the vehicle is formed, extends upward into the sleeve or bearing forming the front end of the vehicle frame. Also an auxiliary part known as the gooseneck is inserted into the upper end of the steering post and is clamped thereto by means of a suitable wedge construction which is tightened by a bolt usually extending axially to the outside of said gooseneck; and said gooseneck carries the handle bars on a forward extension thereof, by means of which the steering post is controlled to steer the vehicle.

In our construction we separate the said forward extending part of the gooseneck from the part which is clamped to the steering post and insert a lock-controlled retractible bolt therein, whereby when the bolt locks the parts together the bicycle may be steered but when the bolt is retracted the said forward extension is loose and the bicycle cannot be controlled through the handlebars. In accomplishing this object we make a few slight changes in the standard construction.

That portion of the structure which relates to clamping the steering post proper with the post extension, which normally forms a part of the gooseneck, is not illustrated herein, and the post extension may be considered as substantially integral with the steering post.

The post extension 1 which is clamped to the steering post (not shown) is a cylindrical tube having an inner shoulder 2 at a point adjacent the top of the frame bearing. The head 3 of the above mentioned clamping bolt 4 engages said shoulder 2. The post 1 is provided with an integral outside flange 5 at its upper end and a second outside flange 6 is secured thereto at a point adjacent the said inside shoulder 2. The boss 7 of the gooseneck 8 is mounted between these two flanges 5 and 6 and is free to rotate on the post 1 at all times except when the parts are locked together as hereinafter described. The gooseneck 8 has the usual screw clamp 9 formed at its end, said clamp being adapted to receive and hold the handle bar 10 of the bicycle.

A removable inner cylinder 11 (Figs. 4, 5, 6) fits in the upper end of the post 1 and rests on the above described shoulder 2, having a recess 12 in its lower end to receive the bolt head 3. A pin 13 extends through the wall of the post 1 adjacent the upper surface of the shoulder 2 and the said cylinder 11 is provided with a notch 14, (Fig. 4) which fits over the pin 13, thereby preventing the cylinder 11 from turning in the post 1.

The horizontal cylindrical recess 15 is formed in the cylinder 11, said recess extending inward from the front side thereof and being adapted to receive the sliding bolt 19 by means of which the boss 7 of the goose neck is locked to the post 1.

A hole 17 is formed in the post 1 coaxial with and of the same diameter as the said recess 15; and a cavity 18 is formed in the boss 7 of the goose neck 8 coaxial with both the recess 15 and the hole 17 when said goose neck 8 is in position for using the bicycle. Thus it will be seen that the recess 15 and the hole 17 are in constant alignment but that the cavity 18 may be swung out of said alignment when the boss 7 of the goose neck 8 is not locked to the post.

The lock bolt 19 fits in the recess 15 and is adapted to project out therefrom to pass through the hole 17 in the post 1 and into the cavity 18 in the boss 7, thereby locking the boss 7 to the post 1. This bolt 19 comprises a generally cylindrical body, having a portion 20 of its upper surface flattened, as shown in Figs. 7 and 8. An operating slot 21 extends across the rear portion of this flat surface 20. The length of the bolt 19 is such that it may be withdrawn from the cylinder 11, (Fig. 3).

A hole 22 extends into the bolt 19 from the rear end thereof, said hole being adapted to receive the actuating spring 23. The spring 23 reacts against the rear wall of the recess 15 to thrust the bolt 19 outward therefrom.

The cylinder 11 is also provided with an upper cylindrical and axial hole 24 extending downward from its upper end and entering the said horizontal recess 15. A vertical slot 25 (Fig. 4) extends down from the upper end of the cylinder 11; and a horizontal slot 26 connects therewith at an intermediate point. The upper end of the cylinder 11 thus forms a sleeve adapted to receive the lock.

A barrel lock 27 of a suitable commercial make fits neatly into hole 24. The lock 27 has a vertical ridge 28 on one side, which fits in the slot 25 and prevents the barrel of the lock from turning in the sleeve. The lock 27 is held from accidental removal by a spring pin 29 which projects from the ridge 28 into a hole 30 in the post 1; a smaller hole 31 is provided in the post 1 communicating with the hole 30, whereby an instrument may be inserted for the depression of the spring pin 29 to permit the removal of the lock 27 for repair or otherwise. The locking cylinder 32 of the barrel lock 27 projects slightly below the barrel and engages the flat surface 20 of the bolt 19 lying in the recess 15 and prevents said bolt 19 from turning on its axis. An eccentric operating pin 33 projects below the cylinder 32 on which it is mounted and enters the cross slot 21 of the lock bolt 19.

The position of the pin 33 relative to the axis of the locking cylinder 32 is eccentric therefrom and its eccentric center is located on the side such that when the cylinder 32 is in the "locked position", in which the key 34 lies across the axis of the bicycle and may be removed from the lock (Fig. 2), the said pin 33 is in its intermediate position; while when the key 34 is turned to lie in the axis of the bicycle as in Fig. 1 it may not be removed from the lock and the eccentric pin 33 is in its furthest forward position. The pin 33 operates the bolt 19 by engaging in the slot 21 thereof, thrusting it forward to lock the boss 7 to the post 1 when it is in its extreme forward position, and withdrawing it from the cavity 18 when it is in its intermediate position. Thus the bicycle may be operated when the key is in the lock and is turned to lie in the axis of the bicycle, but may not be operated if the key lies across the bicycle or is withdrawn therefrom.

When it is desired to remove the cylinder 11 for the purpose of releasing or adjusting the clamp bolt 4, we first retract the bolt 19 and turn the boss 7 of the goose neck 8 to remove the cavity 18 from alignment with the bolt 19 and then remove the lock 27 by depressing the spring pin 29 as above described and then insert a tool 35 into the upper hole 24 in the place of the removed lock 27.

This tool 35 comprises a cylindrical body having a small lug 36 on one side, said lug being adapted to enter the vertical slot 25 and the horizontal slot 26. The lower end of the tool 35 is provided with a portion 37 corresponding with the cylinder 32 of the lock 27 and with a pin 38 corresponding with pin 33 of the lock 27. The pin 38 therefore enters the slot 21 of the bolt 19. The tool 35 is then turned through another quarter turn to further retract the bolt 19 until its end lies entirely within the horizontal recess 15. The cylinder 11 may then be lifted out of the post 1 by lifting on the tool 35 since the lug 36 is then lying in the slot 26. The head 3 of the bolt 4 may then be reached by a suitable socket wrench.

Having, therefore, described our invention, what we claim and desire to secure by Letters Patent, is:—

1. In a vehicle lock, the combination of a hollow cylindrical rotatable steering post forming a part of the vehicle; a steering boss rotatably mounted on the outside thereof, said boss having manually operated means thereon; a cylindrical member removably mounted within the upper end of said steering post; means to prevent the relative rotation of said cylindrical member in said steering post; a horizontal recess formed in said cylindrical member; a corresponding hole in said steering post in alinement with said recess; a corresponding cavity in said boss and normally in alinement with said recess and hole; a lock-bolt slidably mounted in said recess and fitting said hole and cavity, whereby said boss is locked to said steering post; an axial hole in the upper end of said cylinder and forming a lock sleeve; a key-operated barrel-lock mounted in said sleeve; means to hold said lock rigid in said sleeve; and an eccentrically revoluble pin mounted in said lock and engaging said bolt, whereby said bolt is retracted from said cavity when in locked position but is positioned in said cavity when in unlocked position.

2. In a bicycle lock, wherein the steering post extension is clamped to the front fork post by an axial clamping bolt, the combination of a hollow steering post extension, having an inner shoulder formed therein whereon the clamping bolt is anchored; a cylindrical member mounted within said steering post extension and extending down to said shoulder, and having an axial recess formed in its lower end adapted to receive the head of the clamping bolt; a horizontal recess formed in said cylindrical member; a corresponding hole through said steering post extension in alinement with said recess; a lock-bolt slidably mounted in said horizontal recess and fitting said hole whereby said cylindrical member is locked in said steering post extension; an axial hole in the upper end of said cylinder and forming a lock-sleeve; a key-operated barrel lock mounted in said sleeve; means to hold said lock rigid in said sleeve; and an eccentrically mounted pin mounted in said lock and engaging said lock-bolt, whereby said bolt is maintained in said hole in the steering post extension at all times when the lock is in said sleeve, whereby said clamping bolt head is protected from being tampered with.

ALBERT GEORGE SOUTHWELL.
FRANK L. SOUTHWELL.